United States Patent
Cook

(10) Patent No.: US 8,215,058 B2
(45) Date of Patent: Jul. 10, 2012

(54) DRIP EMITTER WITH SEED PACKET

(76) Inventor: Jeffrey A. Cook, Healdsburg, CA (US)

( * ) Notice: Subject to any disclaimer, the term of this patent is extended or adjusted under 35 U.S.C. 154(b) by 73 days.

(21) Appl. No.: 12/858,304

(22) Filed: Aug. 17, 2010

(65) Prior Publication Data

US 2011/0041401 A1   Feb. 24, 2011

Related U.S. Application Data

(60) Provisional application No. 61/234,914, filed on Aug. 18, 2009.

(51) Int. Cl.
 *A01G 27/00* (2006.01)
(52) U.S. Cl. .............. 47/79; 47/61; 47/58.1 SE
(58) Field of Classification Search ........... 47/60, 61, 47/56, 59 R, 64, 63, 62 R, 65, 65.5, 79, 80, 47/81, 58.1 SE, 65.7, 66.6, 73, 74
See application file for complete search history.

(56) References Cited

U.S. PATENT DOCUMENTS

| | | | |
|---|---|---|---|
| 3,914,900 A * | 10/1975 | Bigelow et al. | 47/9 |
| 4,910,911 A | 3/1990 | Ahm | |
| 5,073,401 A * | 12/1991 | Mohr | 426/658 |
| 5,355,622 A * | 10/1994 | Isabelle et al. | 47/65.8 |
| 5,651,214 A * | 7/1997 | Zucker et al. | 47/74 |
| 6,088,957 A * | 7/2000 | Kazemzadeh | 47/58.1 R |
| 6,240,674 B1 | 6/2001 | Otake et al. | |
| 6,701,664 B2 | 3/2004 | Ahm | |
| 7,334,368 B1 | 2/2008 | Ahm | |
| 7,614,181 B2 | 11/2009 | Ahm | |
| 2007/0130827 A1* | 6/2007 | Gesser et al. | 47/62 C |

FOREIGN PATENT DOCUMENTS

GB   2123663 A * 2/1984

* cited by examiner

*Primary Examiner* — Rob Swiatek
*Assistant Examiner* — Lisa Tsang
(74) *Attorney, Agent, or Firm* — Craig M. Stainbrook; Stainbrook & Stainbrook, LLP

(57) ABSTRACT

A seed germination device for use in connection with a drip irrigation system, which includes a drip irrigation emitter having a water inlet tube for connection to a water source, an emitter housing having a base and a perimeter wall that define a partially enclosed interior space, an open end, and a water outlet, and a cellulosic seed packet disposed within the enclosed interior space and over said water outlet tube. When the emitter housing is disposed on or under soil and the water turned on, the seed packet dissolves and the germination commences.

16 Claims, 2 Drawing Sheets

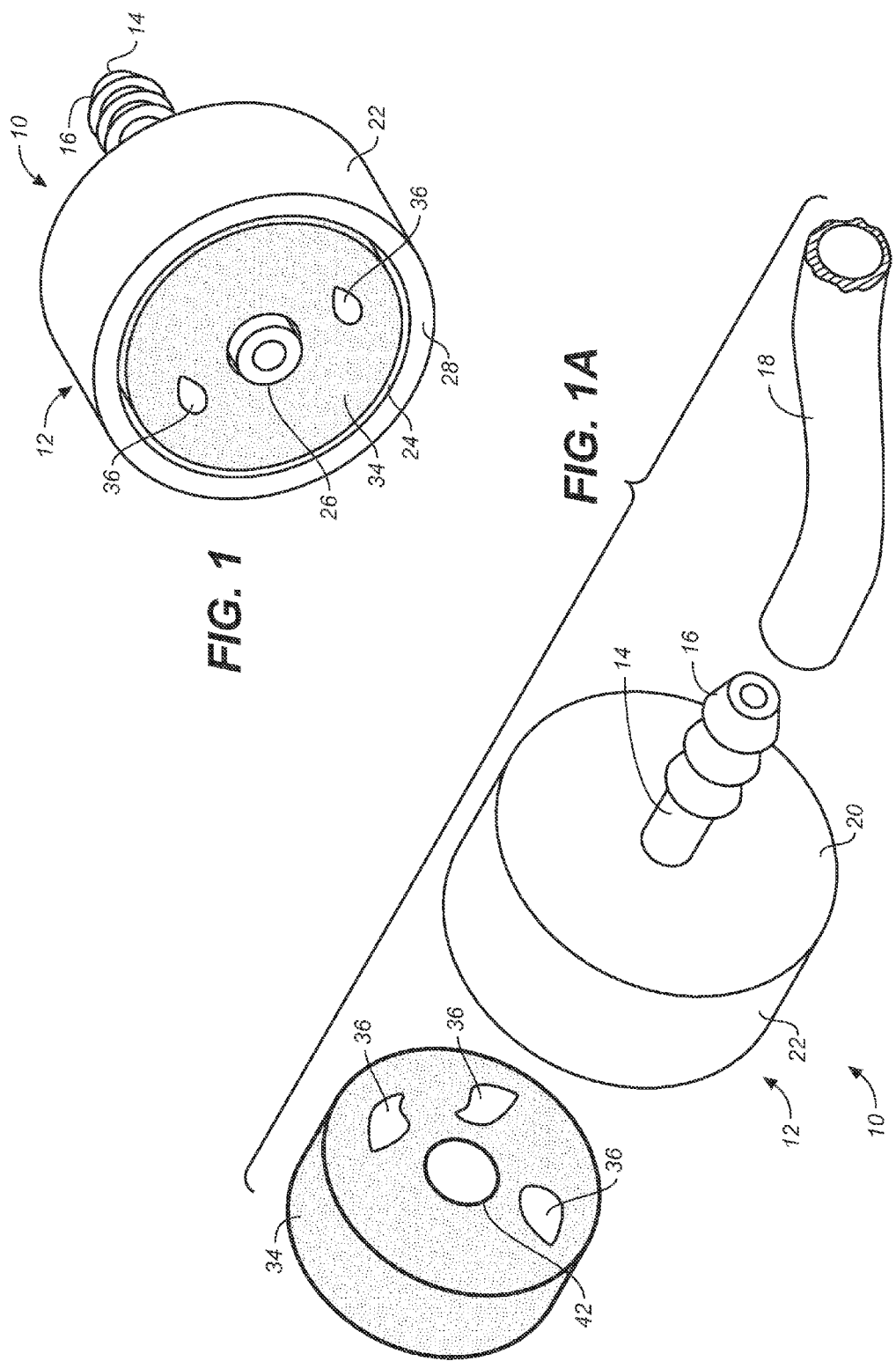

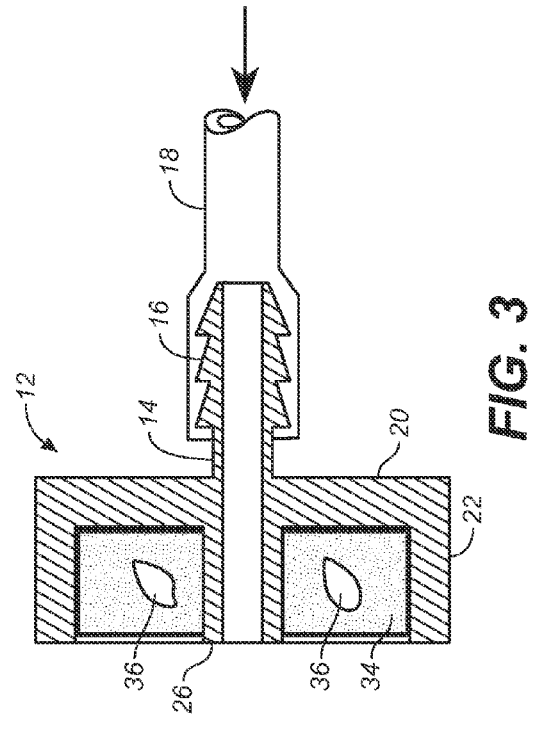
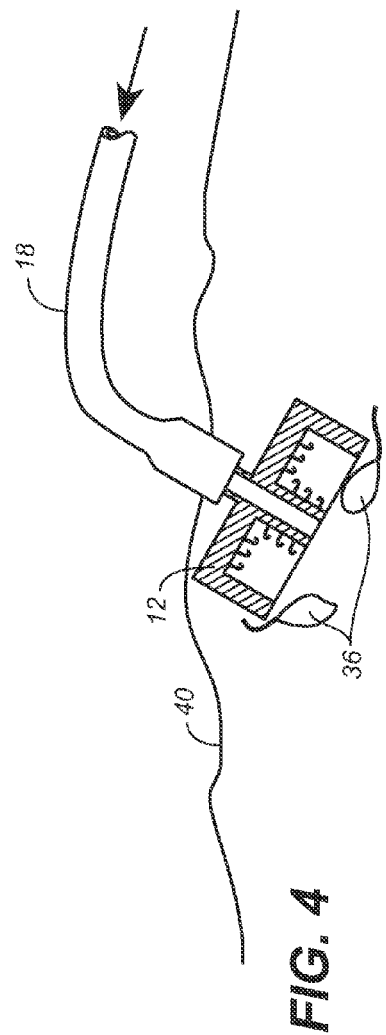
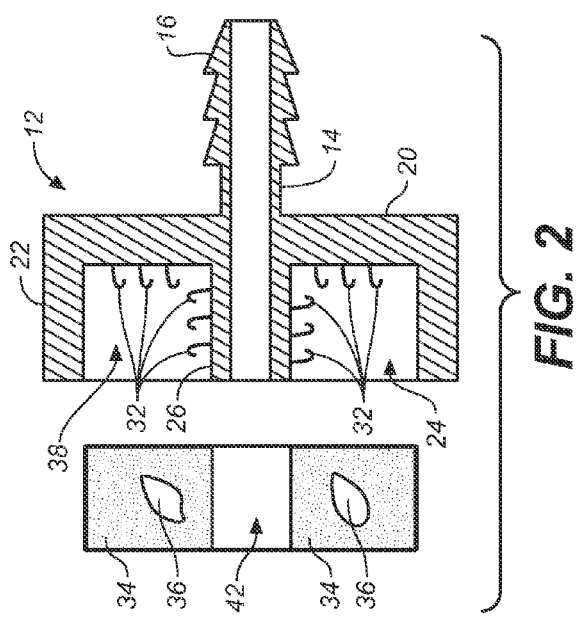

DRIP EMITTER WITH SEED PACKET

CROSS REFERENCES TO RELATED APPLICATIONS

The present application claims the benefit of the filing date of U.S. Provisional Patent Application Ser. No. 61/234,914, filed Aug. 18, 2009 (Aug. 18, 2009).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

SEQUENCE LISTING

Not applicable.

BACKGROUND OF THE INVENTION

1. Field of the Invention

The present invention relates generally to both seed germination systems and drip irrigation systems, and more particularly to a drip emitter configured to contain a cellulosic seed packet, with or without growth stimulating substances (such as fertilizer) and/or pest repellants.

2. Discussion of Related Art Including Information Disclosed Under 37 CFR §§1.97, 1.98

As anyone who has had experience can attest, germinating seeds is a surprisingly involved and uncertain endeavor. When sowing outdoors, germination rates are usually quite low, due to the difficulty of controlling the environmental factors most important to successful germination (viz, water, soil, light, and temperature) and to the difficulty in preventing animals from eating or disturbing the seeds.

Successful indoor germination is considerably easier to achieve, but even then there are challenges in properly hardening off and transplanting the tender new plants. And once transplanted, some kind of irrigation must be provided for the plants. If the irrigation is new to the immediate planting area, then the process of installing irrigation can itself become a threat to the plants, as lines and tools are paraded through planting areas and workers compact soil planting beds with foot traffic.

Accordingly, it would be desirable to provide a system and method for germinating seeds at the irrigation site in which they are intended to grow to maturity, obviating the need for hardening off, transplantation, and installing irrigation after plant placement.

A number of prior art documents show seed germinating devices that provide a medium for maintaining seeds in small spaced-apart packets in moisture absorbing tape, some including plant nutrients. Poul Henrik Ahm of Alicante, Spain has been especially prolific in the development of such apparatus, several iterations of which are described in U.S. Pat. Nos. 4,910,911; 6,701,664; 7,334,368; and 7,614,181; and 6,240,674 to Otake, et al, describes similar seed tape apparatus.

The foregoing patents and/or other publications reflect the current state of the art of which the present inventors are aware. Reference to, and discussion of, these publications is intended to aid in discharging Applicant's acknowledged duty of candor in disclosing information that may be relevant to the examination of claims to the present invention. However, it is respectfully submitted that none of the above-indicated publications disclose, teach, suggest, show, or otherwise render obvious, either singly or when considered in combination, the invention described and claimed herein. Specifically, none of the prior art shows a drip irrigation emitter housing configured to accept and retain a cellulosic seed packet at the planting site.

SUMMARY OF THE INVENTION

The present invention is a method and apparatus for seed germination used in connection with a drip irrigation system. The apparatus includes a drip irrigation emitter housing with a water inlet tube extending from its base for connection to a water source. The emitter housing includes a perimeter wall disposed on the base that defines a partially enclosed interior space and includes an open distal end. Also extending from the base is a water outlet, preferably a tube, that ends generally coplanar with the plane of the perimeter wall edge. A cellulosic seed packet shaped to match the interior space of the housing and having a center hole for placement of the packet around the water outlet tube is disposed within the enclosed interior space and over the water outlet tube. Thus, when the emitter housing is covered lightly with soil or simply placed atop soil and the water then turned on, the seed packet dissolves and the germination process commences.

The novel features characteristic of the invention, as to structure, composition, organization, and method of operation, together with the objects and advantages of the invention will be understood from the following description, considered in connection with the accompanying drawings, in which preferred embodiments of the invention are illustrated by way of example. Those skilled in the art will appreciate that the conception, upon which this disclosure is based, may readily be used as a basis for designing other structures, methods, and systems for carrying out the several purposes of the present invention. The claims should be understood to include such equivalent constructions as far as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an upper end perspective view of the inventive drip emitter and seed packet of the present invention;

FIG. 1A is a schematic exploded perspective view showing the inventive drip emitter and seed packet readied for installation on a water line;

FIG. 2 is a cross-sectional side view in elevation thereof;

FIG. 3 is a cross-sectional side view in elevation showing the seed packet inserted into the packet housing; and FIG. 4 shows the inventive apparatus covered with soil and ready for use.

DETAILED DESCRIPTION OF THE INVENTION

Referring to FIGS. 1 through 4, wherein like reference numerals refer to like components in the various views, there is illustrated therein an inventive drip emitter having a housing for containing a cellulosic seed packet, the apparatus generally denominated 10 herein.

FIGS. 1-4 illustrate a first preferred embodiment of the seed germinating system of the present invention, and these figures collectively show that the system includes a drip emitter housing (or head) 12 having an inlet tube 14 disposed on its proximal side, the inlet tube having connection means 16 for securely attaching the emitter head to an emitter supply line 18 in fluid communication with a high pressure water source. The connection means may comprise barbs, as well known in the art, or a threaded male end that screws either directly into an emitter supply line or into a coupler interposed between the connection means and the emitter supply line.

The housing 12 is preferably generally cylindrical and includes a proximal base 20, an annular perimeter wall 22, and an open distal end 24. Any of a number of suitable alternative housing shapes may be employed as long as the structural elements define a partially enclosed interior space with a substantially open outer or distal end. A water outlet tube 26 in fluid communication with the water inlet tube extends from the base to a point generally in the plane of the outer rim 28 of the perimeter wall. Preferably, either the outlet tube 26 or the base surface 30 includes barbs 32 or other elements to capture and retain a water soluble seed packet 34 containing one or more seeds 36 within the interior space 38 defined by the structural elements of the housing 12.

The seed packet 34 is preferably fabricated from cellulose, primarily because its principal purpose is to carry and contain the seeds only until the packet containing emitter is placed in soil 40. In addition, the packet is preferably cylindrical and sized to fit within the interior space defined by the housing base. The packet includes a center hole 42 that fits over the water outlet tube 26. Thus, when water is applied after placing it on or under soil, the package will dissolve and disintegrate into the soil, leaving only the seeds unobstructed from free germination and early growth. The cellulosic packet may also be provided with nutrients or plant growth stimulating substances, such as fertilizers, and perhaps with pesticides or pest repellants, as well.

According to the present invention, there is thus provided a system and method for germinating seeds in the soil in which the grower wishes the plant to grow to maturity. The cellulosic seed packet is simply inserted into the open end of the housing, secured on the packet retention elements (e.g., barbs), and buried a predetermined depth below the surface in suitable soil (or simply placed on the soil surface for seeds that require light for germination). When the irrigation system is turned on, water from the outlet end of the tube comes into contact with the seed packet, either directly or by migrating through the soil. The soil packet dissolves, releasing the seeds into the soil, and the germination process is underway. Irrigation continues as necessary to keep the soil moist for germination and early root development, and it can then be adjusted to optimize plant vigor and health.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A drip irrigation emitter and seed germination apparatus, comprising:
    a housing having a base, a perimeter wall disposed on said base so as to form an enclosed portion defining an interior space, and an open end;
    a water inlet tube having connection means for securely attaching said housing to an emitter supply line;
    a water outlet tube in fluid communication with said water inlet tube;
    a seed packet disposed within said housing interior space and containing at least one plant seed; and
    wherein said perimeter wall includes an outer rim defining a plane and said water outlet tube extends from said base to a point generally in the plane of said outer rim.

2. The apparatus of claim 1, wherein said seed packet is fabricated from water soluble cellulose, wherein when water is delivered to said housing and through said water outlet tube after placing said housing on or under soil, said seed packet will dissolve and disintegrate into the soil leaving said seeds unobstructed from free germination and early growth.

3. The apparatus of claim 1, wherein said seed packet is sized to fit within the housing interior space.

4. The apparatus of claim 1, wherein said seed packet is sized to fit within the housing interior space.

5. The apparatus of claim 1, wherein said seed packet includes a center hole that fits over said water outlet tube.

6. The apparatus of claim 1, wherein said seed packet includes plant growth nutrients or growth stimulating substances, or a combination thereof.

7. The apparatus of claim 1, further including retention elements disposed on either of said water outlet tube or said base for capturing and retaining said seed packet within the housing interior space.

8. The apparatus of claim 1, wherein said housing is generally cylindrical and includes an annular perimeter wall.

9. The apparatus of claim 8, wherein said seed packet is generally cylindrical.

10. A seed germination system, comprising:
    a drip irrigation emitter, including a water inlet tube for connection to a water source, an emitter housing having a base and a perimeter wall that define a partially enclosed interior space, an open end, and a water outlet;
    a seed packet disposed within the partially enclosed interior space and over said water outlet tube; and
    at least one seed contained within said seed packet.

11. The seed germination system of claim 10, wherein said seed packet is water soluble.

12. The seed germination system of claim 11, where said seed packet is cellulosic.

13. The seed germination system of claim 10, wherein said water outlet is a tube extending from said base.

14. The seed germination system of claim 10, further including packet retention elements disposed within said housing interior space.

15. The seed germination system of claim 10, wherein said seed packet further includes one or more of plant nutrients, fertilizers, and pesticides.

16. The seed germination system of claim 10, wherein said housing is cylindrical.

* * * * *